United States Patent
Harmon-Moore et al.

(10) Patent No.: US 12,323,004 B2
(45) Date of Patent: Jun. 3, 2025

(54) ELECTRIC MOTOR WITH INTEGRATED STATOR COOLING PASSAGES AND METHOD OF MANUFACTURE THEREOF

(71) Applicant: Deere & Company, Moline, IL (US)

(72) Inventors: Cayle D. Harmon-Moore, Independence, KS (US); Stacy K. Worley, Coffeyville, KS (US); Randall L. Long, Coffeyville, KS (US)

(73) Assignee: DEERE & COMPANY, Moline, IL (US)

(*) Notice: Subject to any disclaimer, the term of this patent is extended or adjusted under 35 U.S.C. 154(b) by 303 days.

(21) Appl. No.: 17/663,083

(22) Filed: May 12, 2022

(65) Prior Publication Data

US 2023/0369922 A1 Nov. 16, 2023

(51) Int. Cl.
*H02K 1/20* (2006.01)
*B29C 45/00* (2006.01)

(52) U.S. Cl.
CPC ............... *H02K 1/20* (2013.01); *B29C 45/00* (2013.01)

(58) Field of Classification Search
CPC ............... H02K 1/20; H02K 9/19; H02K 3/24
See application file for complete search history.

(56) References Cited

U.S. PATENT DOCUMENTS

| | | | |
|---|---|---|---|
| 7,545,060 B2 | 6/2009 | Ward | |
| 2017/0047809 A1 | 2/2017 | Sawada et al. | |
| 2017/0271954 A1 | 9/2017 | Hanumalagutti et al. | |
| 2018/0367011 A1* | 12/2018 | Bodla | H02K 3/24 |

FOREIGN PATENT DOCUMENTS

| | | |
|---|---|---|
| CN | 112737197 A | 4/2021 |
| DE | 102011080199 A1 | 2/2013 |
| EP | 0985262 A1 | 3/2000 |
| JP | 2006325369 A | 11/2006 |

OTHER PUBLICATIONS

CN112737197A English translation (Year: 2024).*
DE102011080199A1 English translation (Year: 2024).*
German Search Report issued in application No. DE102023105696.4 dated Oct. 30, 2023 (06 pages).
Fabbaloo, A Much Better Soluble Support Material, @ https://www.fabbaloo.com/2020/02/a-much-better-soluble-support-material, Feb. 4, 2020, Copyright Terran Data Corporation 2021 (12 pages).
3D Printing Spot, Can You Dissolve Polylactic Acid (PLA)? Is it Possible?, @ https://www.3dprintingspot.com/post/can-you-dissolve-polylactic-acid-pla-is-it-possible, updated Sep. 16, 2021 (15 pages).

* cited by examiner

*Primary Examiner* — Christopher M Koehler
*Assistant Examiner* — Viswanathan Subramanian
(74) *Attorney, Agent, or Firm* — KLINTWORTH & ROZENBLAT IP LLP

(57) ABSTRACT

An electric motor includes a stator core and a plurality of stator windings disposed on or in the stator core, with the plurality of stator windings including a plurality of winding end-turns that extend out from the stator core. The electric motor also includes an electrically insulating potting material applied over the plurality of winding end-turns. A cooling passage is formed that defines a cooling circuit through which a cooling fluid is circulated to provide cooling to the plurality of winding end-turns, the cooling passage formed upon dissolving of a chemically soluble material embedded within the potting material.

14 Claims, 5 Drawing Sheets

ELECTRIC MOTOR WITH INTEGRATED STATOR COOLING PASSAGES AND METHOD OF MANUFACTURE THEREOF

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to electric motors and, more particularly, to the cooling of electrical stator windings in such electric motors.

BACKGROUND OF THE DISCLOSURE

Electric motors are utilized in numerous industrial, commercial, and transportation environments, with many agricultural, forestry, and construction work vehicles now utilizing one or more electric motors to provide useful power for vehicle traction or other vehicle or implement operations. In use, electric motors require cooling of components therein to prevent overheating of the motor, with such cooling being provided via air cooling or liquid cooling. A liquid-cooled electric motor typically has an annular jacket positioned between the stator core and the exterior case or housing. Cooling liquid is circulated through the jacket and around the stator core to remove heat from the stator core. Cooling fluid may also be circulated through cooling tubes positioned adjacent the stator.

SUMMARY OF THE DISCLOSURE

In one aspect, the disclosure provides an electric motor with a stator core and a plurality of stator windings disposed on or in the stator core, with the plurality of stator windings including a plurality of winding end-turns that extend out from the stator core. The electric motor also includes an electrically insulating potting material applied over the plurality of winding end-turns. A cooling passage is formed in the potting material that defines a cooling circuit through which a cooling fluid is circulated to provide cooling to the plurality of winding end-turns. The cooling passage is formed upon dissolving a chemically soluble material embedded within the potting material.

In one implementation, the cooling passage is formed in the potting material immediately adjacent a portion of the plurality of winding end-turns, such that the cooling fluid is in direct contact with the portion of the plurality of winding end-turns.

In another implementation, the cooling passage is formed in the potting material proximate to a portion of the plurality of winding end-turns, with a layer of the potting material separating the cooling passage from the portion of the plurality of winding end-turns. In an embodiment, the layer of the potting material separating the cooling passage from the portion of the plurality of winding end-turns has a thickness of 5 mm or less.

In one implementation, the cooling passage has a uniform diameter along a length thereof.

In another implementation, a first portion of the cooling passage has a first diameter and a second portion of the cooling passage has a second diameter different from the first diameter.

In one implementation, the cooling passage has a serpentine configuration.

In one implementation, the plurality of winding end-turns includes a first set of winding end-turns extending out from a first end of the stator core and a second set of winding end-turns extending out from a second end of the stator core. A first potting material is applied over the first set of winding end-turns and a second potting material is applied over the second set of winding end-turns. In an embodiment, a first cooling passage is formed in the first potting material to define a first cooling circuit therethrough, the first cooling passage having an input and an output, and a second cooling passage is formed in the second potting material to define a second cooling circuit therethrough, the second cooling passage having an input and an output.

In one implementation, the cooling passage forms a closed-loop, pressurized cooling circuit through which the cooling fluid is circulated.

In one implementation, the chemically soluble material comprises a 3D printed material applied adjacent to a portion of the plurality of winding end-turns.

In another aspect, a method of manufacturing an electric motor includes providing a stator core and positioning a plurality of stator windings on or in the stator core, the plurality of stator windings including a plurality of winding end-turns that extend out from the stator core. The method also includes applying a chemically soluble material adjacent to a portion of the plurality of winding end-turns, applying an electrically insulating potting material over the plurality of winding end-turns and the chemically soluble material, and dissolving the chemically soluble material so as to form a cooling passage in the potting material that defines a cooling circuit through which a cooling fluid is circulated to provide cooling to the plurality of winding end-turns.

In one implementation, the chemically soluble material is dissolved in a chemical solution bath.

In one implementation, applying the chemically soluble material includes laying down a pre-formed tube adjacent to the portion of the plurality of winding end-turns.

In another implementation, applying the chemically soluble material includes 3D printing a chemically soluble material adjacent to the portion of the plurality of winding end-turns. In one embodiment, 3D printing the chemically soluble material includes 3D printing a first portion of the chemically soluble material to have a first diameter and 3D printing a second portion of the chemically soluble material to have a second diameter different from the first diameter. In one embodiment, 3D printing the chemically soluble material includes 3D printing the chemically soluble material to have a serpentine shape.

In one implementation, applying the chemically soluble material includes applying the chemically soluble material directly onto the portion of the plurality of winding end-turns, such that upon dissolving of the chemically soluble material, the cooling passage is immediately adjacent the portion of the plurality of winding end-turns.

In another implementation, applying the chemically soluble material includes applying the chemically soluble material in a suspended arrangement relative to the portion of the plurality of winding end-turns, such that upon application of the potting material, a layer of the potting material underfills the chemically soluble material to separate the chemically soluble material from the portion of the plurality of winding end-turns. Upon dissolving of the chemically soluble material, the cooling passage is separated from the portion of the plurality of winding end-turns by the layer of the potting material.

In one implementation, the plurality of winding end-turns includes a first set of winding end-turns extending out from a first end of the stator core and a second set of winding end-turns extending out from a second end of the stator core, with the potting material comprising a first potting material applied over the first set of winding end-turns and a second potting material applied over the second set of winding end-turns. Forming of the cooling passage includes forming a first cooling passage in the first potting material to define a first cooling circuit therethrough, the first cooling passage having an input and an output, and forming a second cooling passage in the second potting material to define a second cooling circuit therethrough, the second cooling passage having an input and an output.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1A:
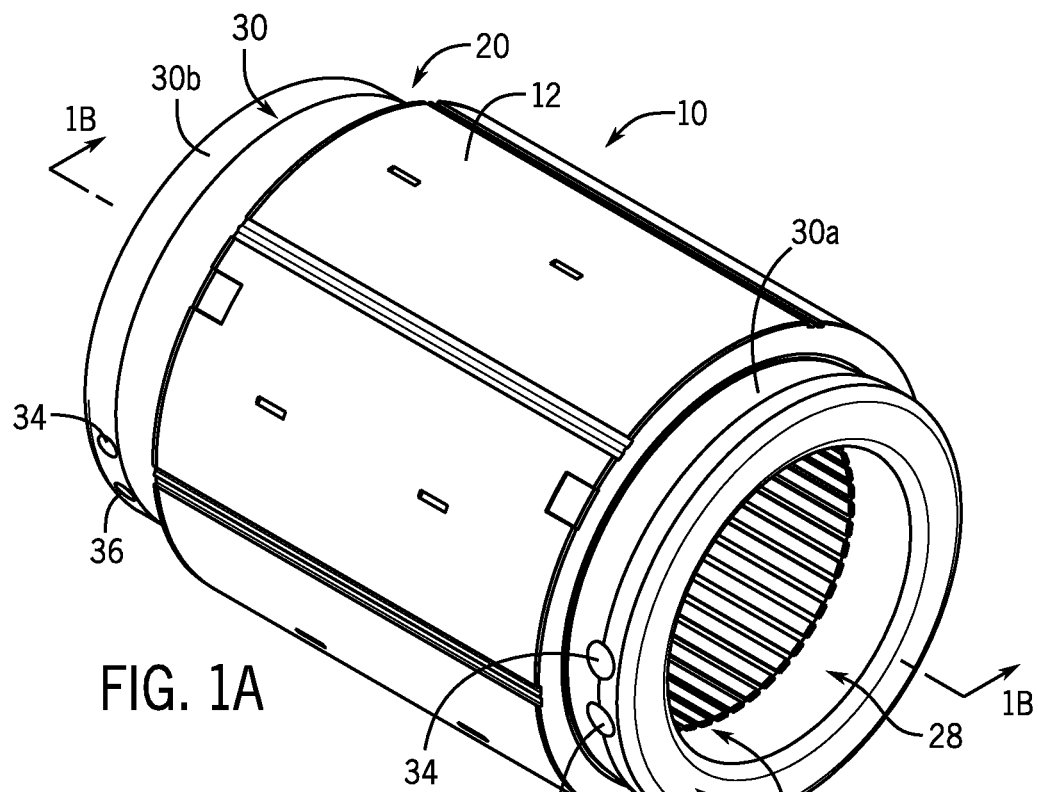
FIG. 1A illustrates an example electric motor, in accordance with an embodiment.

Like reference symbols in the various drawings indicate like elements. For simplicity and clarity of Illustration, descriptions and details of well-known features and techniques may be omitted to avoid unnecessarily obscuring the example and non-limiting embodiments described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As previously noted, electric motors are often cooled via application or circulation of a cooling liquid through an annular jacket positioned between an outside diameter of the stator core and an inside diameter of an exterior stator housing. Another means for cooling the electric motor is to cool the stator winding end-turns, which may be accomplished by circulating cooling liquid through cooling tubes that are circumferentially disposed around the end-turns.

In providing cooling for the stator winding end-turns via the circulation of cooling liquid through cooling tubes positioned adjacent the end-turns, it is recognized that a drawback to such cooling is the reduction in thermal transfer of heat from the end-turns to the cooling liquid that is introduced by the presence of the cooling tubes. That is, the cooling tubes are typically made of a thickness and material that may not have desirable heat transfer characteristics. Accordingly, the amount of heat that may be withdrawn from the stator winding end-turns by the liquid cooling system is reduced, which may lead to the development of hot spots in the stator core and ultimately result in a stator fault or failure in the electric motor.

To enable improved liquid cooling of the stator windings, an electric motor is provided where cooling passages that carry cooling liquid are provided within the stator and adjacent to the stator windings, with the cooling passages being formed in an electrically insulating potting material that is applied over the stator windings. A chemically soluble material is applied adjacent to the stator windings, with the potting material then applied over the end-turns and the material. Subsequent to application of the potting material, the chemically soluble material is dissolved so as to form a cooling passage in the potting material that defines a cooling circuit through which cooling liquid is circulated to provide cooling to the stator winding end-turns. Formation of cooling passages in this manner negates the need for conventional tubing to be utilized for circulation of the cooling liquid, thereby allowing for intimate contact between the cooling liquid and the end-turns. The thermal transfer from the stator windings to the cooling liquid is therefore increased, leading to improved cooling of the stator windings and improved overall operation of the electric motor.

In an embodiment, the cooling passage is formed in the potting material immediately adjacent the stator winding end-turns, such that the cooling fluid is in direct contact with the stator winding end-turns. According to another embodiment, the cooling passage is formed in the potting material proximate to the stator winding end-turns, with a layer of the potting material separating the cooling passage from the stator winding end-turns.

According to various implementations, the cooling passage may have a uniform diameter along a length thereof or may have a varied diameter at different locations. Additionally, the cooling passage may have a serpentine configuration. In implementations where the cooling passage has a more complex shape, such as having varied diameters or non-circular cross-sectional configurations, the chemically soluble material may be formed via a 3D printing application of material adjacent the stator winding end-turns. Complex cooling passages may thus be formed that provide focused or targeted cooling to the stator windings, such as at areas where hot spots may develop on the stator windings.

Example embodiments of an electric motor having cooling passages formed in the electrically insulating potting material and adjacent the stator windings are provided in FIGS. 1-8 according to this disclosure. Methods for manufacturing the electric motor(s) of FIGS. 1-8 are also provided in FIGS. 9 and 10 according to this disclosure.

The following examples notwithstanding, other types of types and configurations of electric motors would also benefit from the cooling arrangement described hereafter. It is therefore recognized that aspects of the invention are not meant to be limited only to the specific embodiments described hereafter.

Figure 1B:
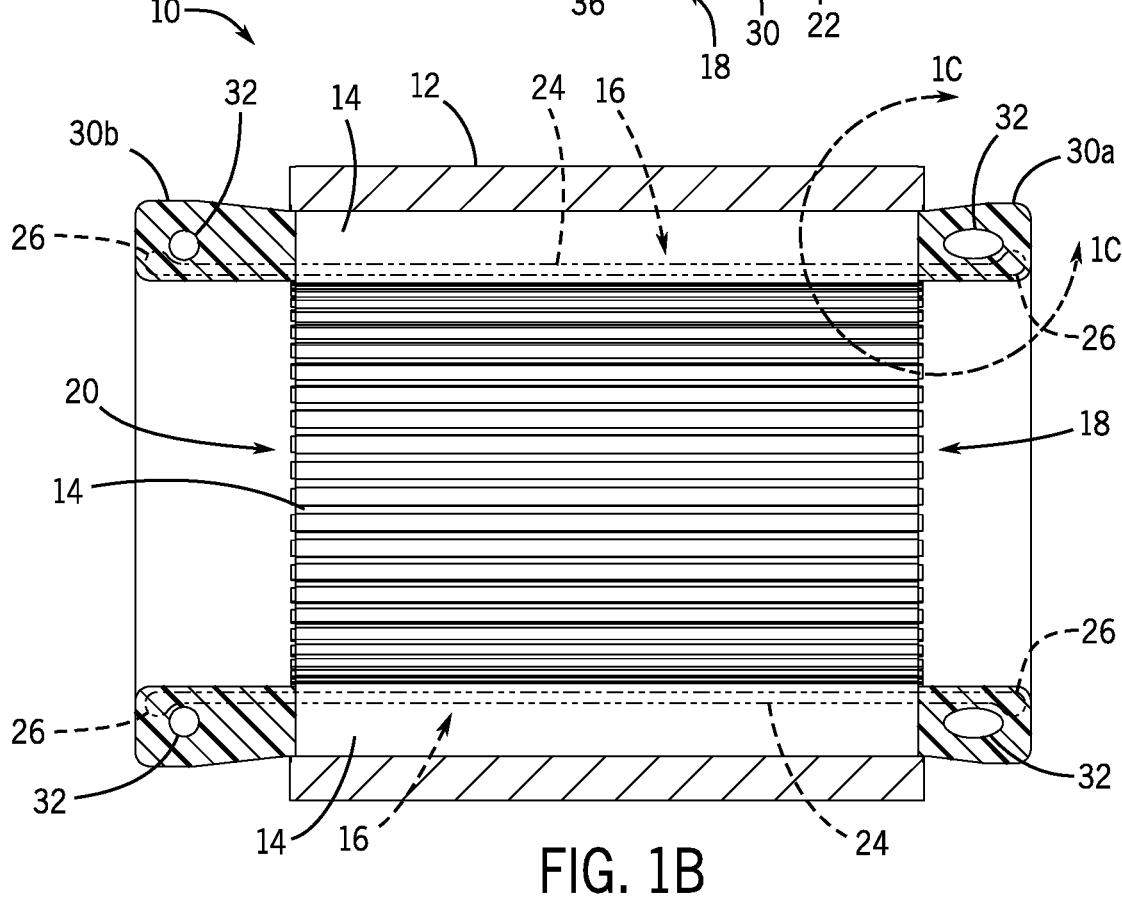
FIG. 1B is a cross-sectional view of the electric motor of FIG. 1A taken along line 1B-1B.
Figure 1C:
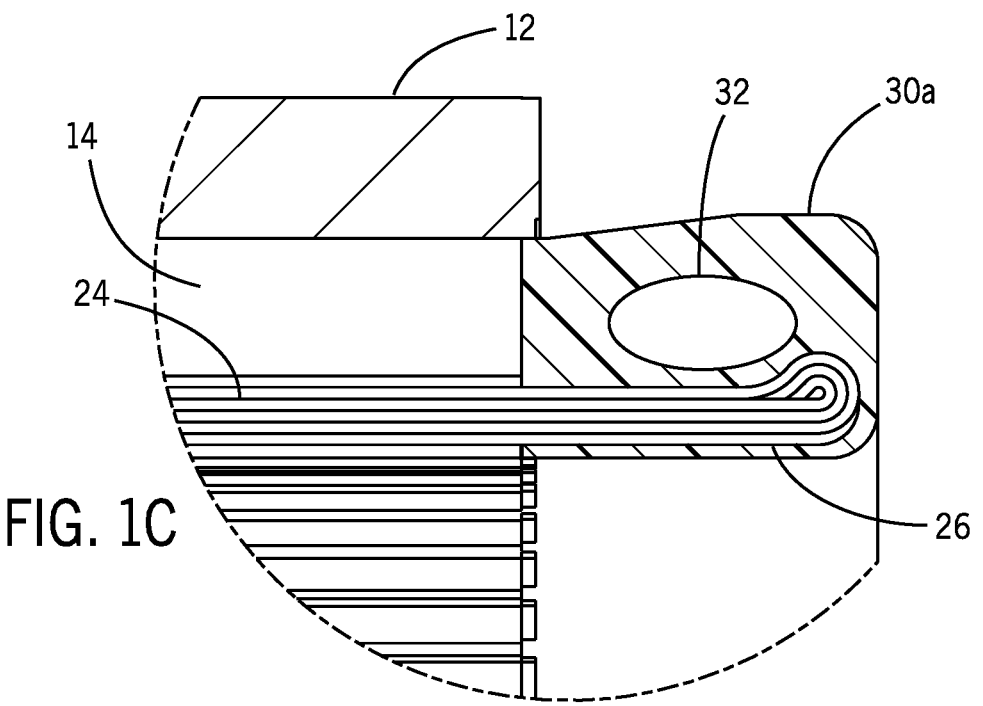
FIG. 1C is a detailed view of portion 1C-1C of the electric motor of FIG. 1B.

Example Embodiments of an Electric Motor with Integrated Stator Cooling Passages Referring initially to FIGS. 1A-1C, an electric motor 10 includes a housing 12 that contains a stator core 14 positioned therein. The stator core 14 may have any of a number of suitable constructions, such as being formed of a substantially solid stack of stator laminations that are uniform in radial length, so that the stator lamination stack has a smooth outer diameter. A plurality of stator slots 16 is formed within the stator core 14 that extend from a first end 18 of the stator core to a second end 20 of the stator core, such that slot ends 22 of the stator slots 16 are provided at each of the ends 18, 20.

A plurality of electrically conductive wire stator windings 24 are wound in and through the stator slots 16. The stator windings 24 can be placed in the stator slots 16 and travel back and forth longitudinally between the first end 18 and the second end 20 of the stator core 14. Stator winding end-turns 26 are formed as the stator windings 24 exit at the ends 18, 20 and are redirected into subsequent stator slots 16 and/or are redirected in and through the same stator slot 18. The end-turns 26 generally form an annular ring at each of opposing ends 18, 20 of the stator core 14 that extends out past the respective end of the stator core 14.

The stator core 14 also includes a rotor receiving opening 28 that accommodates positioning of a rotor (not shown) therein. It can be appreciated that any suitable rotor can be used in the electric motor 10, such as, but not limited to permanent-magnet rotors or squirrel-cage rotors. The electric motor 10 may thus operate through the interaction between a magnetic field of the rotor and electric current in the stator windings 24 to generate a rotation force that causes the rotor to turn.

As shown best in FIGS. 1B and 1C, the stator winding end-turns 26 are potted in an electrically insulating potting material 30 that provides protection and electrical insulation thereto. The potting material 30 can be an epoxy resin, silicon, or a similar material that can gel or harden after being dispensed. The desired potting material 30 for specific applications can be formulated based on characteristics such as dielectric constant, thermal conductivity, thermal expansion, chemical resistance, etc. The stator winding end-turns 26 may be potted so as to be substantially covered by and embedded in the potting material 30.

Components of the electric motor 10, and in particular the stator windings 24, can generate heat during operation of the electric motor 10. It is recognized that cooling of the stator windings 24 can enhance the performance of and increase the lifespan of the electric motor 10.

First, the portions of the stator windings 24 that are positioned in the slots 16 of the stator core 14 may be cooled via the transfer of thermal energy therefrom to the stator core 14, with the stator core 14 in turn cooled by a cooling jacket (not shown) disposed annularly between the housing 12 and the stator core 14. The cooling jacket can contain cooling liquid such as propylene glycol, ethylene glycol, oil, and/or a suitable refrigerant, that is circulated throughout the cooling jacket to draw heat from the stator core 14, with the cooling liquid acting as a heat transfer medium to extract heat from the stator core 14.

Additionally, and according to embodiments, the stator winding end-turns 26 that extend out past the ends 18, 20 of the stator core 14 are cooled via circulation of cooling liquid through cooling passages 32 in the stator 10 that are formed into the potting material 30 and adjacent the end-turns 26. FIGS. 1B and 1C, as well as FIGS. 2-8, show embodiments of cooling passages 32 formed in the potting material 30 that provide a cooling circuit through which cooling liquid is circulated to provide improved cooling to the stator winding end-turns 26. According to embodiments, the cooling passages 32 may be formed at locations adjacent the surface of the stator winding end-turns 26 or embedded within a group of stator winding end-turns 26, to provide cooling thereto. While FIGS. 1-8 show only a single cooling passage 32 formed in the potting material 30 at each of the opposing ends 18, 20 of the stator core 14, i.e., in each of a first potting material 30a and a second potting material 30b, it is recognized that multiple cooling passages 32 could be formed in each of the first potting material 30a and the second potting material 30b, to further increase the cooling provided to the end-turns 26. For example, two, three, or more cooling passages 32 could be formed in the potting material 30, with the specific number of cooling passages 32 being specific to, for example, the size of the respective cooling passages 32 and/or the electric motor model and cooling capacity required. In still another embodiment, a single continuous cooling passage 32 could be provided that is routed through the first potting material 30a, extends across an area of the housing 12 and stator core 14, and is routed through the second potting material 30b.

As shown in each of the embodiments of FIGS. 1-8, a cooling passage 32 formed adjacent the stator winding end-turns 26 at each of ends 18, 20 includes an input 34 through which cooling liquid is provided to the cooling passage 32 and an output 36 through which cooling liquid exits the cooling passage 32. While the input 34 and output 36 of the cooling passage 32 are shown formed adjacent each other on one side of the potting material 30, it is recognized that the input 34 and output 36 could be formed on opposing sides of the potting material 30. The cooling passages 32 may operate as part of a pressurized, closed-loop cooling system for the stator winding end-turns 26, with cooling liquid drawn from a cooling liquid reservoir (not shown) and circulated through the cooling passage 32 before being returned under pressure to the cooling liquid reservoir for re-circulation through the cooling passages 32 (after heat is removed therefrom via a heat exchanger, for example). Each cooling passage 32 is generally annular in shape to match the configuration or arrangement of the end-turns 26, thereby providing for arrangement of the cooling passage 32 adjacent to the end-turns 26.

According to embodiments, the cooling passages 32 are formed in the potting material 30 and adjacent the end-turns 26 via use of a chemically soluble material 38 that is utilized during a fabrication process of the electric motor 10. The chemically soluble material 38 may be formed of any of a number of suitable chemically soluble materials, such as a chemically soluble polymer like polylactic acid (PLA), as one example. As will be explained in further detail below, the chemically soluble material 38 may be applied adjacent to the end-turns 26 (i.e., adjacent the surface of the end-turns 26 or embedded within a group of end-turns 26) prior to addition of the potting material 30, such as via application of a pre-formed tubing, via a 3D printing application of material, or via another suitable application technique, with the potting material 30 added after application of the chemically soluble material 38 so as to embed the chemically soluble material 38 and the end-turns 26 therein. The chemically soluble material 38 is then dissolved upon exposure thereof to a chemical solution/solvent, with the cooling passages 32 thus being formed in the potting material 30 upon dissolving of the chemically soluble material 38. In some embodiments, the chemically soluble material 38 may be formed as a hollow structure having a channel or passage therein through which the chemical solution may be circulated, so as to aid in dissolving and removal of the chemically soluble material from within the potting material 30. In other embodiments, a reversible pumping action or process may be employed by which the chemical solution is added and removed during dissolving of the chemically soluble material 38.

According to embodiments, the material 38 may be applied at a location immediately adjacent a portion of the stator winding end-turns 26 or with a desired separation between the material 38 and the stator winding end-turns 26, with a thin layer of potting material 30 therebetween. In a configuration where the material 38 is applied at a location immediately adjacent a portion of the stator winding end-turns 26 and then subsequently dissolved to form the cooling passage 32, cooling fluid circulated through the cooling passage 32 will be in direct contact with the end-turns 26. In a configuration where the material 38 is applied (and suspended) at a location separated from the stator winding end-turns 26—with a thin layer of potting material 30 filling in therebetween upon application of the potting material 30—dissolving of the material 38 results in formation of a cooling passage 32 separated from the stator winding end-turns 26, such that cooling fluid circulated through the cooling passage 32 is separated from end-turns 26 by the thin layer of potting material 30. The layer of potting material 30 separating the chemically soluble material 38 and the stator winding end-turns 26 would have a thickness of 5 mm or less and preferably much less than 1 mm, i.e., fractions of a mm, down to effectively a zero thickness.

As indicated above, the chemically soluble material 38 may be provided as pre-formed tubing or formed via a 3D printing application of material. Regarding material 38 formed via a 3D printing application, application of the material 38 via 3D printing allows for essentially limitless configurations for the material 38 (and resulting cooling passage 32), both in terms of its configuration in 3D space and in its cross-section. Thus, as examples, material 38 having a serpentine or spiral configuration in 3D space may be formed and/or material 38 having a constant or varied cross-section may be formed, including non-circular cross sections such as elliptical, rectangular, or trapezoidal cross-sections, or any other cross-section that may function to increase surface area contact between the material 38 (and resulting cooling passage 32) and the end-turns 26.

Figure 2A:
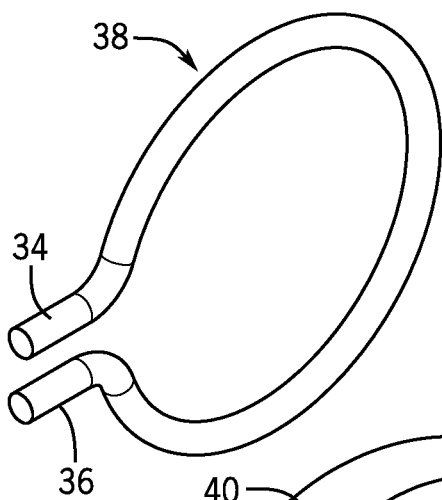
FIG. 2A is a perspective view of a cooling passage in isolation that is formed in electrically insulating potting material of the electric motor of FIG. 1, in accordance with an embodiment.

Referring to FIG. 2A, a chemically soluble material 38 that may be applied adjacent to the end-turns 26 for subsequent formation of a cooling passage 32 is shown according to one embodiment. The material 38 illustrated in FIG. 2A has a uniform diameter along a length thereof and therefore could be provided as a pre-formed tubing that is laid down adjacent to the end-turns 26 at a location where it is desired for the cooling passage 32 to be subsequently formed. Alternatively, the material 38 could be formed via a 3D printing technique, being applied at a location where it is desired for the cooling passage 32 to be subsequently formed.

Figures 2B, 2C:
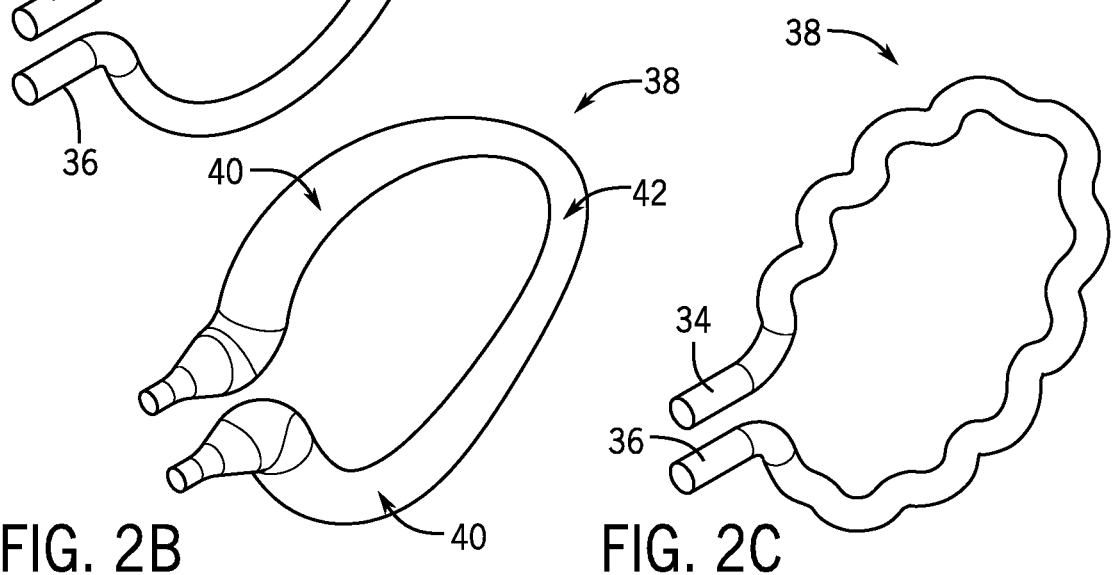
FIG. 2B is a perspective view of a cooling passage in isolation that is formed in electrically insulating potting material of the electric motor of FIG. 1, in accordance with another embodiment.
FIG. 2C is a perspective view of a cooling passage in isolation that is formed in electrically insulating potting material of the electric motor of FIG. 1, in accordance with another embodiment.

Referring to FIG. 2B, a chemically soluble material 38 that may be applied adjacent to the end-turns 26 for subsequent formation of a cooling passage 32 is shown according to another embodiment. The material 38 illustrated in FIG. 2B has a more complex shape than that of the material 38 of FIG. 2A, with the material 38 having differing diameters at different locations along a length thereof, such as having a larger diameter 40 at locations corresponding to potential "hot spots" on the stator winding end turns and a smaller diameter 42 at other locations. With the more complex geometry of the material 38 in FIG. 2B, the material 38 could be formed via a 3D printing technique where the material 38 is printed into a desirable shape from a chemically soluble material. The material 38 can be formed and applied adjacent to the end-turns 26 at a location where it is desired for the cooling passage 32 to be subsequently formed.

Referring to FIG. 2C, a chemically soluble material 38 that may be applied adjacent to the end-turns 26 for subsequent formation of a cooling passage 32 is shown according to still another embodiment. The material 38 illustrated in FIG. 2C has a serpentine shape that can be routed back and forth to increase a contact area between the stator winding end-turns 26 and the material 38 (and the resulting cooling passage 32 formed upon dissolving of the material 38). With the more complex geometry of the serpentine material 38 in FIG. 2C, the material 38 could be formed via a 3D printing technique where the material 38 is printed into a desirable shape from a chemically soluble material. The material 38 can be formed and applied adjacent to the end-turns 26 at a location where it is desired for the cooling passage 32 to be subsequently formed.

Figure 3:
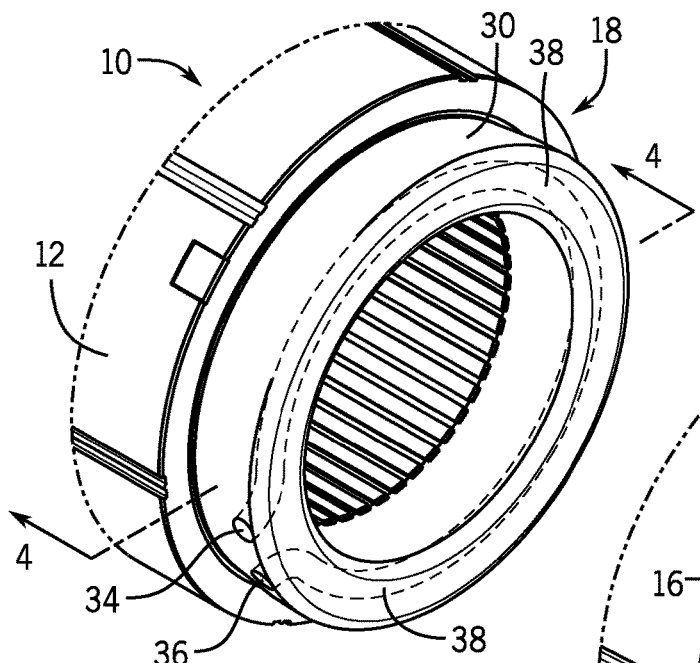
FIG. 3 is a partial perspective view of the electric motor of FIG. 1 illustrating a cooling passage formed in the potting material and adjacent end-turns of the stator windings, in accordance with an embodiment.
Figure 4:
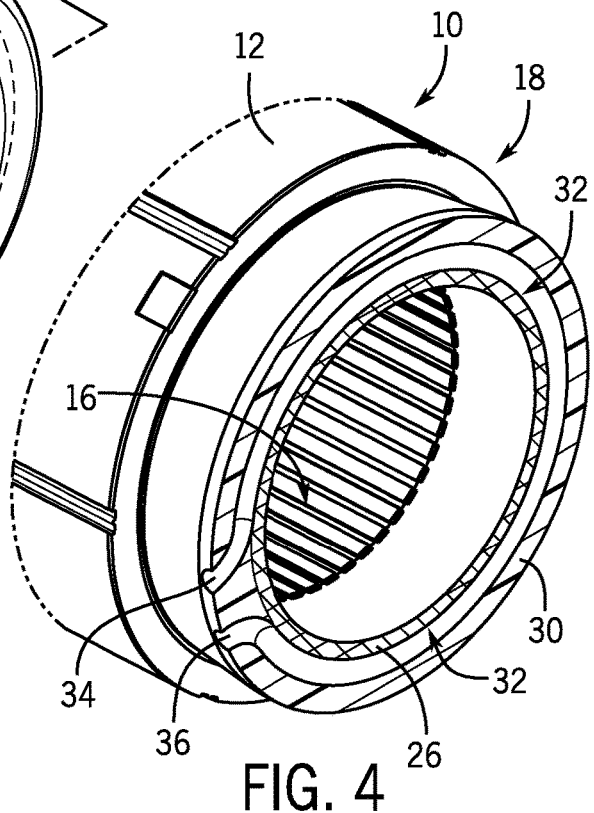
FIG. 4 is a partial perspective view of the electric motor showing a cross-section of the cooling passage taken along line 4-4 of FIG. 3.
Figure 5A:
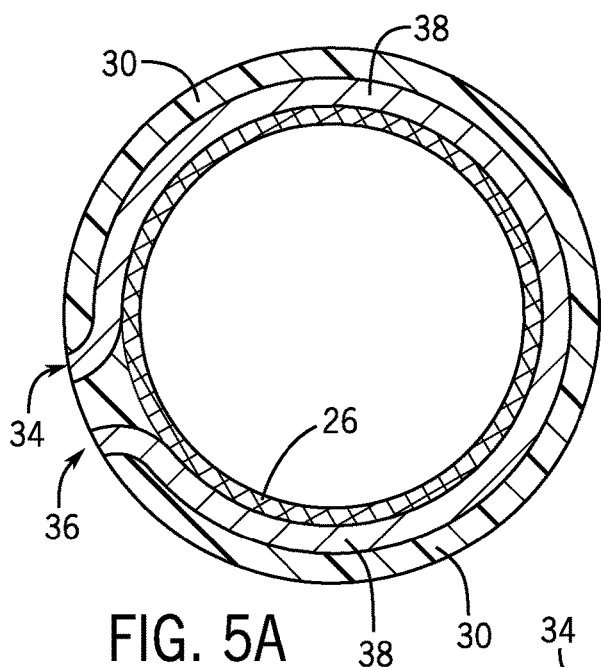
FIG. 5A is an end view of the electric motor of FIG. 4 showing a chemically soluble material embedded in the potting material.

Illustration of a chemically soluble material 38 and a resulting cooling passage 32 formed in the potting material 30 upon dissolving thereof is shown in greater detail in FIGS. 3 and 4 and FIGS. 5A and 5B, with the material 38/cooling passage 32 having a structure according to the embodiment of FIG. 2A. As shown in FIGS. 3 and 5A, in forming a cooling passage 32 within the potting material 30, the chemically soluble material 38 is initially applied adjacent the stator winding end-turns 26, such as via laying down of a pre-formed tubing onto the end-turns 26, with the potting material 30 then being subsequently added after application of the chemically soluble material 38 so as to embed the chemically soluble material 38 and the end-turns 26 therein. The chemically soluble material 38 is applied so as to be generally annular in shape and thereby match the configuration or arrangement of the stator winding end-turns 26. According to embodiments, the material 38 may be applied adjacent an end surface of the end-turns 26 or may be applied so as to be circumferentially disposed around the end-turns 26, such that the material 38 is adjacent a portion of the end-turns 26 in either embodiment.

Figure 5B:
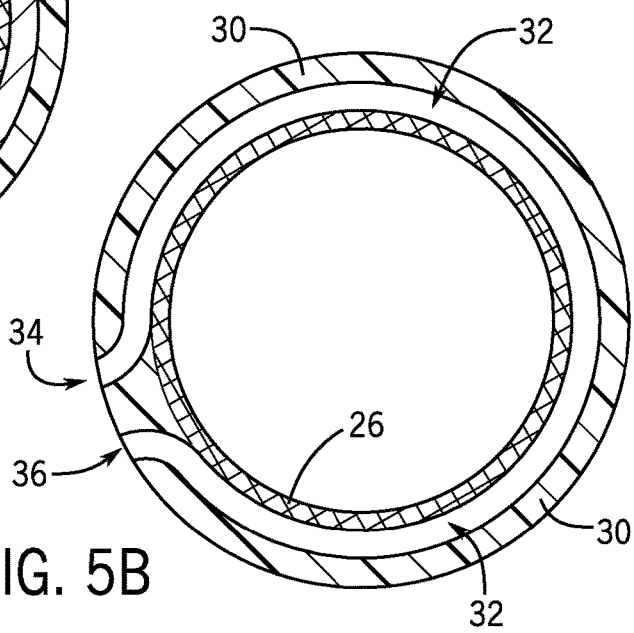
FIG. 5B is an end view of the electric motor of FIG. 4 showing the cooling passage formed in the potting material upon dissolving of the chemically soluble material of FIG. 5A.

As shown in FIGS. 4 and 5B, a cooling passage 32 is left formed in the potting material 30 upon dissolving of the chemically soluble material 38. As described above regarding the material 38, the resulting cooling passage 32 is generally annular in shape to match the configuration or arrangement of the stator winding end-turns 26, with the cooling passage 32 positioned adjacent an end surface of the end-turns 26 or circumferentially disposed around the end-turns 26. Cooling liquid may be introduced into 23 the cooling passage 32 through an input 34 extending through the potting material 30, with the cooling liquid circulating along a coolant path defined by the cooling passage 32 before exiting the cooling passage 32 via an output 36 extending through the potting material 30.

Figure 6:
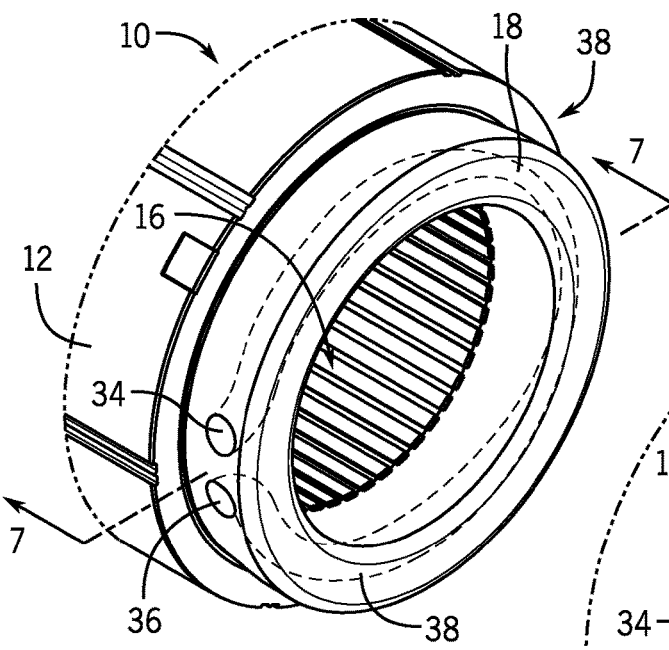
FIG. 6 is a partial perspective view of the electric motor of FIG. 1 illustrating a cooling passage formed in the potting material and adjacent end-turns of the stator windings, in accordance with another embodiment.
Figure 7:
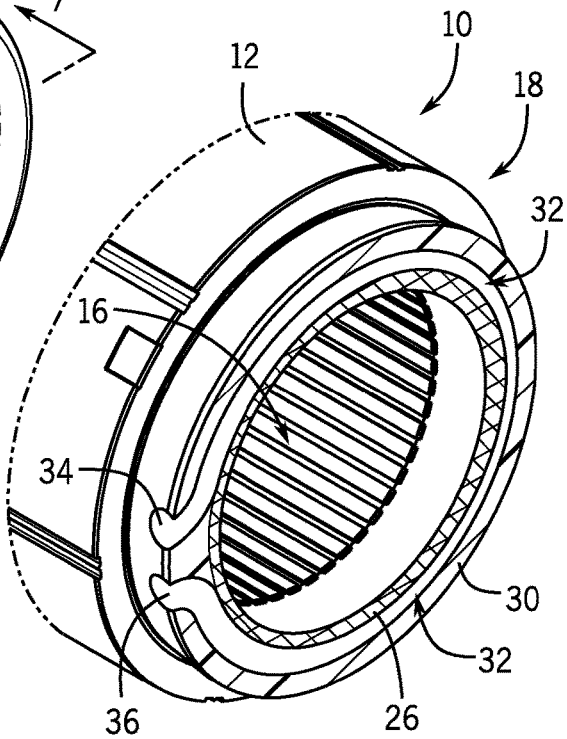
FIG. 7 is a partial perspective view of the electric motor showing a cross-section of the cooling passage taken along line 7-7 of FIG. 6.
Figure 8A:
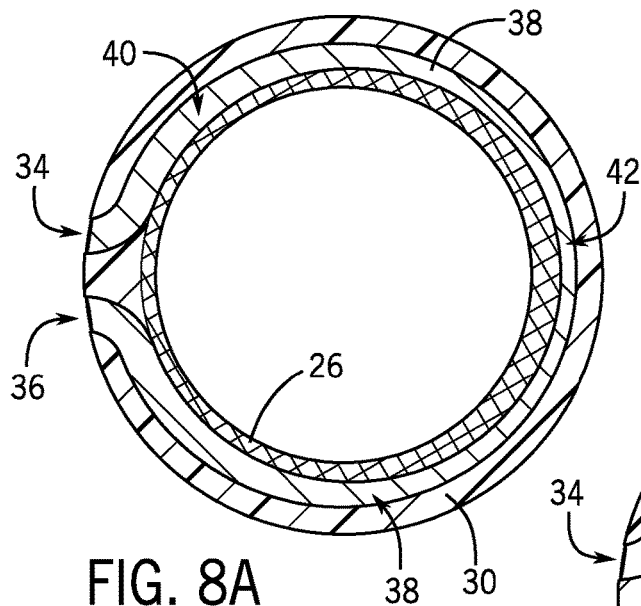
FIG. 8A is an end view of the electric motor of FIG. 7 showing a chemically soluble material embedded in the potting material.

Illustration of another chemically soluble material 38 and a resulting cooling passage 32 formed in the potting material 30 upon dissolving thereof is shown in greater detail in FIGS. 6 and 7 and FIGS. 8A and 8B, with the material 38/cooling passage 32 having a structure according to the embodiment of FIG. 2B. As shown in FIGS. 6 and 8A, in forming a cooling passage 32 within the potting material 30, the chemically soluble material 38 is initially applied adjacent the stator winding end-turns 26, such as via forming and applying material onto the end-turns 26 through a 3D printing operation (to enable fabrication of the complex-shaped material 38 of FIG. 2B), with the potting material 30 then being subsequently added after application of the chemically soluble material 38 so as to embed the chemically soluble material 38 and the end-turns 26 therein. The chemically soluble material 38 is applied so as to be generally annular in shape and thereby match the configuration or arrangement of the stator winding end-turns 26. According to embodiments, the material 38 may be applied adjacent an end surface of the end-turns 26 or may be applied so as to be circumferentially disposed around the end-turns 26, such that the material 38 is adjacent a portion of the end-turns 26 in either embodiment.

Figure 8B:
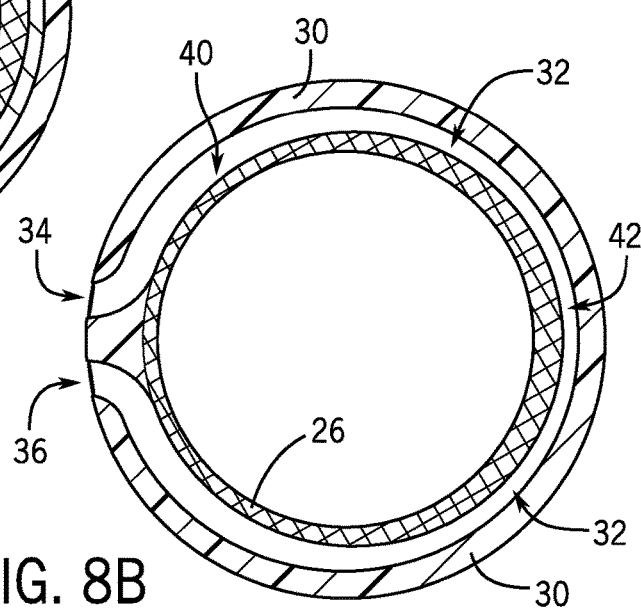
FIG. 8B is an end view of the electric motor of FIG. 7 showing the cooling passage formed in the potting material upon dissolving of the chemically soluble material of FIG. 8A.

As shown in FIGS. 7 and 8B, a cooling passage 32 is left formed in the potting material 30 upon dissolving of the chemically soluble material 38. As described above regarding the material 38, the resulting cooling passage 32 is generally annular in shape to match the configuration or arrangement of the stator winding end-turns 26, with the cooling passage 32 positioned adjacent an end surface of the end-turns 26 or circumferentially disposed around the end-turns 26. Cooling liquid may be introduced into the cooling passage 32 through an input 34 extending through the potting material 30, with the cooling liquid circulating along a coolant path defined by the cooling passage 32 before exiting the cooling passage 32 via an output 36 extending through the potting material 30.

Figure 9:
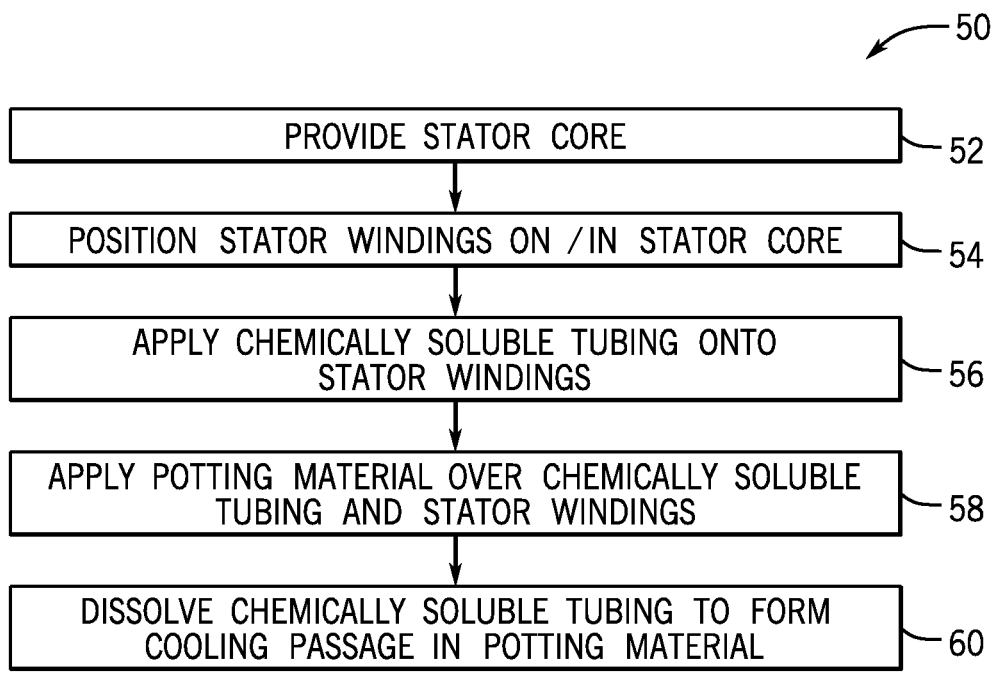
FIG. 9 is a flowchart for a method for manufacturing an electric motor having a cooling passage formed in an electrically insulating potting material of the electric motor, in accordance with an embodiment.
Figure 10:
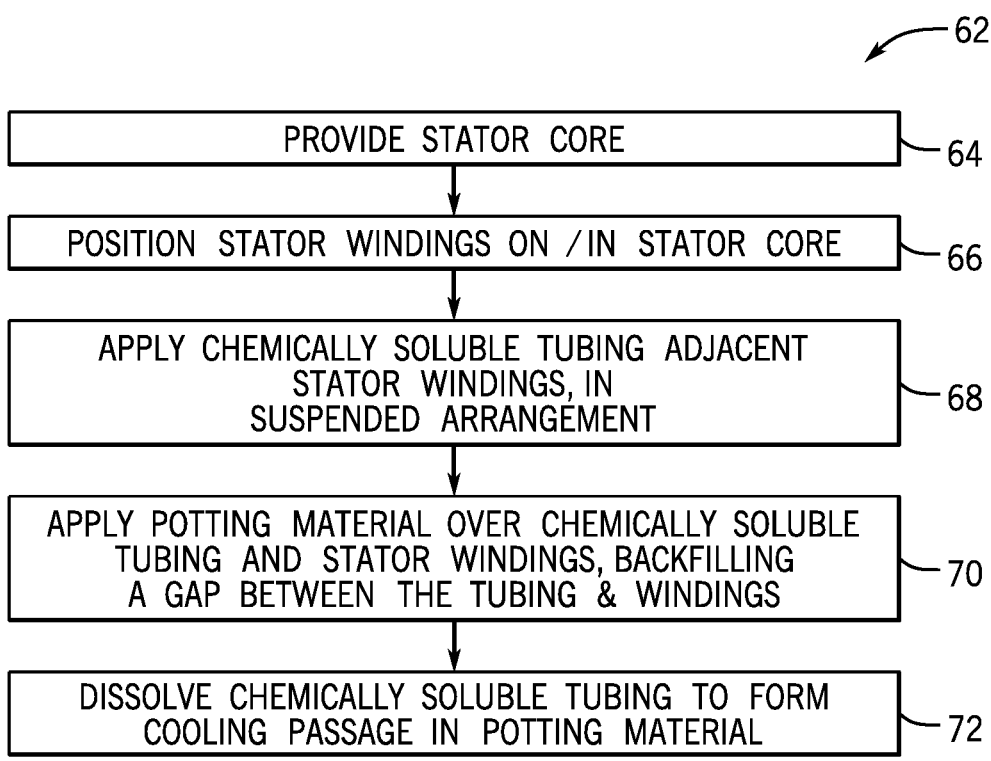
FIG. 10 is a flowchart for a method for manufacturing an electric motor having a cooling passage formed in an electrically insulating potting material of the electric motor, in accordance with another embodiment.

Referring now to FIG. 9, and with continued reference to FIGS. 1-8, a flowchart illustrating a method 50 of manufacturing an electric motor 10 is provided, according to an embodiment. According to the method 50 of FIG. 9, an electric motor 10 is manufactured where cooling passages 32 that carry cooling liquid therethrough are formed directly adjacent stator winding end-turns 26 of the electric motor 10. This positioning of the cooling passage 32 allows for intimate contact between the cooling liquid and the end-turns 26.

The method 50 begins with providing a stator core 14 at step 52. As previously described, the stator core 14 may have any of a number of suitable constructions, such as being formed of a substantially solid stack of stator laminations (not shown) that are uniform in radial length. A plurality of electrically conductive stator windings 24 is then positioned on or in the stator core 14 at step 54. The stator windings 24 may be wound in and through the stator slots 16 formed in the stator core 14, back and forth longitudinally between the first end 18 and the second end 20 of the stator core 14, with winding end-turns 26 being formed as the stator windings 24 exit at the ends 18, 20 of the stator core 14 and are redirected back into the stator slots 16.

At step 56, a chemically soluble material 38 is applied directly onto the stator winding end-turns 26 of the electric motor 10. According to embodiments, the chemically soluble material 38 may be applied onto the surface of the stator winding end-turns 26 or embedded within a group of stator winding end-turns 26 (i.e., applied in/on the windings 24 before they are formed and laced in the stator core 14 to form the end-turns 26, so as to be embedded therein). The chemically soluble material 38 may be formed of a chemically soluble polymer like polylactic acid (PLA), for example. In one embodiment, a single continuous length of chemically soluble material 38 is applied onto the end-turns 26 at each of opposing ends of the stator core 14, i.e., to the end-turns 26 extending out past the stator core 14 on each of ends 18, 20, with the material 38 applied adjacent an end surface of the end-turns 26 or applied so as to be circumferentially disposed around the end-turns 26. According to other embodiments, a plurality of lengths of material 38 (e.g., 2, 3, or more) may be applied onto the end-turns 26 at each of opposing ends 18, 20 of stator core 14.

In performing step 56, the chemically soluble material 38 applied onto the end-turns 26 may be in the form of a pre-formed tubing structure or a 3D printed material, according to embodiments. For embodiments where the material 38 is of a "simple" type having a uniform diameter along a length thereof, the material 38 may be in the form of a pre-formed tubing structure. For embodiments where the material 38 is of a more "complex" type, such as material 38 having portions with a first diameter and portions with a second diameter or material 38 having a serpentine configuration, the material 38 may be 3D printed. In some embodiments, the chemically soluble material 38 may be formed as a hollow structure having a channel or passage therein that aids in dissolving of the material.

Upon application of the chemically soluble material 38, an electrically insulating potting material 30 is applied over the stator winding end-turns 26 and the chemically soluble material 38 at step 58. As shown in FIG. 1, potting material 30 may be applied over the end-turns 26 and material 38 at each of the opposing ends of the electric motor 10, such that first and second potting materials 30*a*, 30*b* may be separately identified in the electric motor 10. The potting material 30 can be an epoxy resin, silicon, or a similar material that is applied onto the end-turns 26 and material 38 via a dip application or spray application. The potting material 30 thus embeds the stator winding end-turns 26 and the chemically soluble material 38 therein upon gelling or hardening of the material.

Subsequent to application of the potting material 30, the chemically soluble material 38 is dissolved at step 60. In one implementation, the chemically soluble material 38 is dissolved in a chemical bath of appropriate solution, such as methyl ethyl ketone, acetone, ethyl acetate, tetrahydrofuran, or caustic soda, as examples (where the material is PLA). In other embodiments, the chemically soluble material 38 is dissolved via a reversible pumping action or process by which a chemical solution is added and removed and for removal of the dissolved chemically soluble material 38. Dissolving of the chemically soluble material 38 results in the formation a cooling passage 32 in the potting material 30 at the locations where the material 38 was previously present. As previously described, with chemically soluble material 38 being embedded in each of the first and second potting materials 30*a*, 30*b* that embed the end-turns 26 at opposing ends of the electric motor 10, a cooling passage 32 will thus be formed in each potting material 30 (i.e., a "first" cooling passage and a "second" cooling passage, each having an input 34 and output 36). Each cooling passage 32 in the potting material 30 defines a cooling circuit through which a cooling fluid may be circulated to provide cooling to the stator winding end-turns 26. With the chemically soluble material 38 being applied directly onto the stator winding end-turns 26, as previously indicated, the resulting cooling passage 32 that is correspondingly formed upon dissolving of the material 38 will also be positioned directly adjacent the end-turns 26. The cooling fluid that flows through the cooling passage 32 will thus be in intimate contact with the end-turns 26 to provide cooling thereto.

Referring now to FIG. 10, and again with continued reference to FIGS. 1-8, a flowchart illustrating a method 62 of manufacturing an electric motor 10 is provided, according to another embodiment. According to the method 62 of FIG. 10, an electric motor 10 is manufactured where cooling passages 32 that carry cooling liquid therethrough are separated from the stator winding end-turns 26 of the electric motor 10 by a thin layer of potting material 30, as may be desirable for applications that require or specify a cooling liquid not suitable for direct contact with the end-turns 26.

The method 62 begins with providing a stator core 14 at step 64. As previously described, the stator core 14 may have any of a number of suitable constructions, such as being formed of a substantially solid stack of stator laminations that are uniform in radial length. A plurality of electrically conductive stator windings 24 is then positioned on or in the stator core 14 at step 66. The stator windings 24 may be wound in and through the stator slots 16 formed in the stator core 14, back and forth longitudinally between the first end 18 and the second end 20 of the stator core 14, with winding end-turns 26 being formed as the stator windings 24 exit at the ends 18, 20 of the stator core 14 and are redirected back into the stator slots 16.

At step 68, a chemically soluble material 38 is applied near the stator winding end-turns 26 of the electric motor 10, with the chemically soluble material 38 applied so as to be in a suspended arrangement relative to the stator winding end-turns 26, such as via the use of supports. The chemically soluble material 38 may be formed of a chemically soluble polymer like polylactic acid (PLA), for example. In one embodiment, a single continuous length of chemically soluble material 38 is applied proximate the end-turns 26 at each of opposing ends of stator core 14, i.e., to the end-turns 26 extending out past the stator core 14 on each of ends 18, 20, with the material 38 applied adjacent an end surface of the end-turns 26 or applied so as to be circumferentially disposed around the end-turns 26. According to other embodiments, a plurality of lengths or material 38 (e.g., 2, 3, or more) may be applied adjacent the end-turns 26 at each of opposing ends 18, 20 of stator core 14.

In performing step 68, the chemically soluble material 38 applied onto the end-turns 26 may be in the form of a pre-formed tubing structure or a 3D printed material, according to embodiments. For embodiments where the material 38 is of a "simple" type having a uniform diameter along a length thereof, the material 38 may be in the form of a pre-formed tubing structure. For embodiments where the material 38 is of a more "complex" type, such as material 38 having portions with a first diameter and portions of a second diameter or material 38 having a serpentine configuration, the material 38 may be 3D printed. In some embodiments, the chemically soluble material 38 may be formed as a hollow structure having a channel or passage therein that aids in dissolving of the material.

Upon application of the chemically soluble material 38, an electrically insulating potting material 30 is applied over the stator winding end-turns 26 and the chemically soluble material 38 at step 70 to embed the end-turns 26 and material 38 therein. As shown in FIG. 1, potting material 30 may be applied over the end-turns 26 and material 38 at each of the opposing ends of the electric motor 10, such that first and second potting materials 30*a*, 30*b* may be separately identified in the electric motor 10. The potting material 30 can be an epoxy resin, silicon, or a similar material that is applied onto the end-turns 26 and material 38 via a dip application or spray application. With the chemically soluble material 38 being in a suspended arrangement relative to the stator winding end-turns 26, a portion of the potting material 30 that is applied underfills or backfills the gap between the material 38 and the end-turns 26, thereby forming a thin layer of potting material 30 (e.g., 5 mm or less, and preferably fractions of a mm) between the chemically soluble material 38 and the stator winding end-turns 26.

Subsequent to application of the potting material 30, the chemically soluble material 38 is dissolved at step 72. In one implementation, the chemically soluble material 38 is dissolved in a chemical bath of appropriate solution, such as methyl ethyl ketone, acetone, ethyl acetate, tetrahydrofuran, or caustic soda, as examples (where the material is PLA). In other embodiments, the chemically soluble material 38 is dissolved via a reversible pumping action or process by which a chemical solution is added and removed and for removal of the dissolved chemically soluble material 38. Dissolving of the chemically soluble material 38 results in the formation a cooling passage 32 in the potting material 30 at the locations where the material 38 was previously present. As previously described, with chemically soluble material 38 being embedded in each of the first and second potting materials 30*a*, 30*b* that embed the end-turns 26 at opposing ends of the electric motor 10, a cooling passage 32 will thus be formed in each potting material 30*a*, 30*b*. Each cooling passage 32 in the potting material 30 defines a cooling circuit through which a cooling fluid may be circulated to provide cooling to the stator winding end-turns 26. With the chemically soluble material 38 being initially suspended relative to the stator winding end-turns 26 and potting material 30 backfilling the gap between the material 38 and the end-turns 26, as previously indicated, the resulting cooling passage 32 that is correspondingly formed upon dissolving of the material 38 will be separated from the end-turns 26 by a thin layer of potting material 30, with the layer of potting material 30 having a minimal thickness that enables an efficient transfer of heat from the stator winding end-turns 26 to the cooling fluid.

CONCLUSION

The foregoing has thus provided an electric motor, and method of manufacturing thereof, that includes cooling passages at locations within the stator, adjacent to the stator windings of the motor. The cooling passages are formed directly into an electrically insulating potting material that is applied over the stator windings. The cooling passages are formed via an initial application of chemically soluble material adjacent to the stator winding end-turns, with the potting material then applied over the end-turns and the material. Subsequent to application of the potting material, the chemically soluble material is dissolved so as to form a cooling passage in the potting material that defines a cooling circuit through which cooling liquid is circulated to provide cooling to the stator winding end-turns. Formation of cooling passages in this manner negates the need for conventional tubing to be utilized for circulation of the cooling liquid, thereby allowing for intimate contact between the cooling liquid and the stator windings. The thermal transfer from the end-turns to the cooling liquid is therefore increased, leading to improved cooling of the stator windings and improved operation of the electric motor overall. Additionally, a controllable application of the chemically soluble material at desired locations relative to the stator windings enables the formation of complex cooling passages that provide focused or targeted cooling to the stator windings, such as at areas where hot spots may develop on the stator windings.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An electric motor comprising:
    a stator core;
    a plurality of stator windings disposed on or in the stator core, the plurality of stator windings including a plurality of winding end-turns that extend out from the stator core;
    an electrically insulating potting material applied over the plurality of winding end-turns; and
    a cooling passage formed in the potting material immediately adjacent a portion of the plurality of winding end-turns that defines a cooling circuit through which a cooling fluid is circulated in direct contact with the portion of the plurality of winding end-turns to provide cooling to the plurality of winding end-turns, the cooling passage having an annular shape matching a configuration of the winding end-turns circumferentially disposed around the winding end-turns and varying in cross-section circumferentially around the winding end-turns, the cooling passage formed upon dissolving of a chemically soluble material embedded within the potting material.

2. The electric motor of claim 1, wherein a first portion of the cooling passage has a first diameter and a second portion of the cooling passage has a second diameter different from the first diameter.

3. The electric motor of claim 1, wherein the cooling passage has a serpentine configuration.

4. The electric motor of claim 1, wherein the plurality of winding end-turns comprises:
    a first set of winding end-turns extending out from a first end of the stator core; and
    a second set of winding end-turns extending out from a second end of the stator core;
    wherein the potting material comprises a first potting material applied over the first set of winding end-turns and a second potting material applied over the second set of winding end-turns.

5. The electric motor of claim 4, wherein the cooling passage comprises:
    a first cooling passage formed in the first potting material to define a first cooling circuit therethrough, the first cooling passage having an input and an output; and
    a second cooling passage formed in the second potting material to define a second cooling circuit therethrough, the second cooling passage having an input and an output.

6. The electric motor of claim 1, wherein the cooling passage forms a closed-loop, pressurized cooling circuit through which the cooling fluid is circulated.

7. The electric motor of claim 1, wherein the chemically soluble material comprises a 3D printed material applied adjacent to a portion of the plurality of winding end-turns.

8. A method of manufacturing an electric motor, the method comprising:
    providing a stator core;

positioning a plurality of stator windings on or in the stator core, the plurality of stator windings including a plurality of winding end-turns that extend out from the stator core;

applying a chemically soluble material adjacent to a portion of the plurality of winding end-turns directly onto the portion of the plurality of winding end-turns circumferentially around the winding end-turns in an annular shape matching a configuration of the winding end-turns and varying in cross-section circumferentially around the winding end-turns;

applying an electrically insulating potting material over the plurality of winding end-turns and the chemically soluble material; and dissolving the chemically soluble material so as to form a cooling passage in the potting material immediately adjacent the portion of the plurality of winding end-turns that defines a cooling circuit through which a cooling fluid is circulated in direct contact with the portion of the plurality of winding end-turns to provide cooling to the plurality of winding end-turns.

9. The method of claim 8, wherein dissolving the chemically soluble material comprises dissolving the chemically soluble material in a chemical solution bath.

10. The method of claim 8, wherein applying the chemically soluble material comprises laying down a pre-formed annular tube adjacent to the portion of the plurality of winding end-turns.

11. The method of claim 8, wherein applying the chemically soluble material comprises 3D printing a chemically soluble material adjacent to the portion of the plurality of winding end-turns.

12. The method of claim 11, wherein 3D printing the chemically soluble material comprises:

3D printing a first portion of the chemically soluble material to have a first diameter; and 3D printing a second portion of the chemically soluble material to have a second diameter different from the first diameter.

13. The method of claim 11, wherein 3D printing the chemically soluble material comprises 3D printing the chemically soluble material to have a serpentine shape.

14. The method of claim 8, wherein the plurality of winding end-turns comprises a first set of winding end-turns extending out from a first end of the stator core and a second set of winding end-turns extending out from a second end of the stator core, with the potting material comprising a first potting material applied over the first set of winding end-turns and a second potting material applied over the second set of winding end-turns; and wherein the forming the cooling passage comprises:

forming a first cooling passage in the first potting material to define a first cooling circuit therethrough, the first cooling passage having an input and an output; and forming a second cooling passage in the second potting material to define a second cooling circuit therethrough, the second cooling passage having an input and an output.

* * * * *